(12) United States Patent
Sugaya et al.

(10) Patent No.: US 11,395,057 B2
(45) Date of Patent: Jul. 19, 2022

(54) WATERPROOF SOUND-TRANSMITTING MEMBER AND ELECTRONIC DEVICE PROVIDED THEREWITH

(71) Applicant: NITTO DENKO CORPORATION, Osaka (JP)

(72) Inventors: Yosuke Sugaya, Osaka (JP); Bunta Hirai, Osaka (JP); Takeo Inoue, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 277 days.

(21) Appl. No.: 16/761,367

(22) PCT Filed: Nov. 7, 2018

(86) PCT No.: PCT/JP2018/041408
§ 371 (c)(1),
(2) Date: May 4, 2020

(87) PCT Pub. No.: WO2019/093394
PCT Pub. Date: May 16, 2019

(65) Prior Publication Data
US 2021/0176550 A1 Jun. 10, 2021

(30) Foreign Application Priority Data
Nov. 9, 2017 (JP) .................. 2017-216121

(51) Int. Cl.
*H04R 1/08* (2006.01)
*H04M 1/03* (2006.01)
*H04R 1/44* (2006.01)

(52) U.S. Cl.
CPC .............. *H04R 1/086* (2013.01); *H04M 1/03* (2013.01); *H04R 1/44* (2013.01); *H04R 2499/11* (2013.01)

(58) Field of Classification Search
CPC ...... H04R 1/086; H04R 1/44; H04R 2499/11; H04R 1/02; H04R 2307/025; H04M 1/03; H04M 1/026; H04M 1/18
See application file for complete search history.

(56) References Cited

U.S. PATENT DOCUMENTS

2009/0268928 A1 10/2009 Ikeyama et al.
2011/0255728 A1 10/2011 Abe et al.
(Continued)

FOREIGN PATENT DOCUMENTS

CN  105659714 A  6/2016
JP  2003-503991 A  1/2003
(Continued)

OTHER PUBLICATIONS

International Search Report issued in PCT/JP2018/041408, dated Jan. 15, 2019, along with an English translation thereof.

*Primary Examiner* — Tuan D Nguyen
(74) *Attorney, Agent, or Firm* — Greenblum & Bernstein, P.L.C.

(57) ABSTRACT

The waterproof sound-transmitting member of the present disclosure includes: a waterproof sound-transmitting membrane configured to prevent entry of water while permitting sound to pass therethrough, and a support layer joined to a main surface of the waterproof sound-transmitting membrane. The waterproof sound-transmitting membrane has an air permeability of 10,000 seconds/100 mL or more as expressed by Gurley number, the support layer includes a resin foam material and has a through hole extending in a thickness direction thereof and serving as a path for sound transmitted through the waterproof sound-transmitting membrane, and a side air permeability of the support layer between the through hole and an outer peripheral side surface of the support layer when the support layer is compressed in the thickness direction thereof at a compres- (Continued)

sion ratio of 20% is 0.1 mL/(min·mm$^3$) or more as a value per unit volume of the support layer.

10 Claims, 6 Drawing Sheets

(56) References Cited

U.S. PATENT DOCUMENTS

| | | |
|---|---|---|
| 2016/0228826 A1 | 8/2016 | Furuuchi |
| 2016/0376144 A1* | 12/2016 | Holliday ............. H04R 1/086 257/416 |
| 2017/0006369 A1 | 1/2017 | Kenaley et al. |
| 2017/0325011 A1 | 11/2017 | Kuki et al. |
| 2018/0315409 A1 | 11/2018 | Matsuo et al. |

FOREIGN PATENT DOCUMENTS

| | | |
|---|---|---|
| JP | 2007-81881 A | 3/2007 |
| JP | 2011-78089 A | 4/2011 |
| JP | 2016-213829 A | 12/2016 |
| WO | 01/03468 A2 | 1/2001 |
| WO | 2017/090246 | 6/2017 |

\* cited by examiner

WATERPROOF SOUND-TRANSMITTING MEMBER AND ELECTRONIC DEVICE PROVIDED THEREWITH

TECHNICAL FIELD

The present invention relates to a waterproof sound-transmitting member and an electronic device provided therewith.

BACKGROUND ART

An electronic device such as a mobile phone, a smartphone, a laptop computer, an electronic organizer, a digital camera, or a game device has an audio function. A sound converter such as a speaker, a buzzer, or a microphone is housed inside a housing of an electronic device having an audio function. The housing is provided with an opening for introducing sound from the outside to the sound converter and/or from the sound converter to the outside. In an electronic device that claims waterproof performance, a waterproof sound-transmitting membrane may be placed so as to cover the opening to prevent entry of water into the housing. The waterproof sound-transmitting membrane is a membrane that prevents entry of water while permitting transmission of sound. Patent Literature 1 discloses a waterproof sound-transmitting membrane composed of a porous polytetrafluoroethylene (PTFE) membrane. Patent Literature 2 discloses a waterproof sound-transmitting membrane composed of a non-porous membrane of a resin such as PTFE.

Patent Literature 3 discloses an acoustic protective cover assembly including a waterproof sound-transmitting membrane composed of a porous PTFE membrane and an acoustic gasket joined to a main surface of the membrane via a double-faced adhesive tape.

CITATION LIST

Patent Literature

Patent Literature 1: JP 2007-81881 A
Patent Literature 2: JP 2011-78089 A
Patent Literature 3: JP 2003-503991 A

SUMMARY OF INVENTION

Technical Problem

A waterproof sound-transmitting membrane composed of a non-porous membrane can have high waterproofness as compared to a waterproof sound-transmitting membrane composed of a porous PTFE membrane. In addition, the waterproof sound-transmitting membrane composed of the non-porous membrane can prevent transmission of water vapor from the outside to a sound conversion part, and, for example, can prevent performance deterioration and malfunction of the sound conversion part due to condensation of transmitted water vapor. In electronic devices that require high waterproof performance, there is a demand for a waterproof sound-transmitting membrane composed of a non-porous membrane.

Waterproofness required for an electronic device is achieved by placing the waterproof sound-transmitting membrane so as to cover the opening of the housing. However, if the space between the waterproof sound-transmitting membrane and a sound-transmitting port of the sound converter is an open space, good sound performance of the electronic device cannot be necessarily ensured, due to reflection, absorption, resonance, etc., of sound in this space. In the case where the sound converter is a microphone, a sound receiving portion thereof is close to the space, and thus the sound performance is particularly significantly deteriorated. To improve the sound performance, for example, the following method is conceivable: an elastic member having a sound path is compressed and placed between the waterproof sound-transmitting membrane and the sound conversion part so as to be in close contact with both the waterproof sound-transmitting membrane and the sound conversion part, whereby the space between the waterproof sound-transmitting membrane and the sound-transmitting port of the sound conversion part is made into a surrounded space including the path and acoustically insulated from another space inside the housing. The elastic member is, for example, the acoustic gasket of Patent Literature 3. In consideration of the small thickness of the waterproof sound-transmitting membrane and a production process for the electronic device, the elastic member is preferably supplied in a state of being joined to the waterproof sound-transmitting membrane, that is, as a waterproof sound-transmitting member including the waterproof sound-transmitting membrane and the elastic member joined to the membrane. By making such a waterproof sound-transmitting member, occurrence of misalignment or the like between the waterproof sound-transmitting membrane and the elastic member when being placed inside the housing can be inhibited.

However, according to the study by the present inventors, when a waterproof sound-transmitting member including a waterproof sound-transmitting membrane composed of a non-porous membrane and the elastic member is made, a variation in the sound transmission characteristics of the sound-transmitting member is great after the sound-transmitting member is placed inside the housing. In recent electronic devices, particularly in electronic devices such as a smartphone in which various functions are easily implemented by software, it is common to correct deterioration of sound characteristics due to transmission through a waterproof sound-transmitting membrane by software. However, if a variation in the sound transmission characteristics of the waterproof sound-transmitting member is great, such correction is difficult, so that it is difficult to ensure designed sound performance that should be originally obtained for an electronic device.

It is an object of the present invention to provide a waterproof sound-transmitting member that includes a waterproof sound-transmitting membrane including a non-porous membrane but reduces a variation in sound transmission characteristics after being placed inside a housing of an electronic device or the like.

Solution to Problem

The present invention provides a waterproof sound-transmitting member including:

a waterproof sound-transmitting membrane configured to prevent entry of water while permitting sound to pass therethrough; and a support layer joined to a main surface of the waterproof sound-transmitting membrane, wherein the waterproof sound-transmitting membrane has an air permeability of 10,000 seconds/100 mL or more as expressed by Gurley number, the support layer includes a resin foam material and has a through hole extending in a thickness direction thereof and serving as a path for sound transmitted through the waterproof sound-transmitting membrane, and a side air permeability of the support layer between the through hole and an outer peripheral side surface of the support layer when the support layer is compressed in the thickness direction thereof at a compression ratio of 20% is 0.1 mL/(min·mm$^3$) or more as a value per unit volume of the support layer.

According to another aspect, the present invention provides an electronic device including:

a sound conversion part configured to convert between an electric signal and sound and having a sound-transmitting port;

a housing in which the sound conversion part is housed, the housing having an opening located between the sound conversion part and an outside; and a waterproof sound-transmitting membrane placed inside the housing so as to cover the opening and configured to prevent entry of water while permitting sound to pass therethrough via the opening, wherein the waterproof sound-transmitting membrane has an air permeability of 10,000 seconds/100 mL or more as expressed by Gurley number, a support layer is joined to a main surface of the waterproof sound-transmitting membrane that is opposite to a main surface at the opening side of the waterproof sound-transmitting membrane, the support layer includes a resin foam material, the support layer has a through hole extending in a thickness direction thereof and serving as a path for sound transmitted through the waterproof sound-transmitting membrane, the support layer is placed, in a state of being compressed in the thickness direction thereof, between the housing and the sound conversion part such that the through hole and the waterproof sound-transmitting membrane cover the sound-transmitting port, and a side air permeability of the support layer between the through hole and an outer peripheral side surface of the support layer is 0.1 mL/(min·mm$^3$) or more as a value per unit volume of the support layer.

Advantageous Effects of Invention

When a waterproof sound-transmitting member including a waterproof sound-transmitting membrane including a non-porous membrane and an elastic member such as the acoustic gasket of Patent Literature 3 is placed inside a housing such that the elastic member is located between the waterproof sound-transmitting membrane and a sound conversion part, the space between the waterproof sound-transmitting membrane and the sound-transmitting port of the sound conversion part is a closed space unlike the case where the waterproof sound-transmitting membrane is a porous PTFE membrane having air permeability. When the elastic member is compressed in this state so as to be in close contact with both the waterproof sound-transmitting membrane and the sound conversion part, the pressure in the space rises and the waterproof sound-transmitting membrane bulges in the direction to the opening of the housing. This bulge causes the above-mentioned variation in the sound transmission characteristics of the waterproof sound-transmitting member.

On the other hand, in the waterproof sound-transmitting member of the present invention, the support layer located between the waterproof sound-transmitting membrane and a sound conversion part when the waterproof sound-transmitting member is placed inside a housing has a certain side air permeability.

Thus, owing to the side air permeation, the pressure in the space between the waterproof sound-transmitting membrane and the sound-transmitting port of the sound conversion part does not excessively rise even when the support layer is compressed so as to be in close contact with both the waterproof sound-transmitting membrane and the sound conversion part, and the above bulge of the waterproof sound-transmitting membrane is inhibited. Accordingly, a waterproof sound-transmitting member that includes a waterproof sound-transmitting membrane including a non-porous membrane but reduces a variation in sound transmission characteristics after being placed inside a housing of an electronic device or the like, can be attained.

DESCRIPTION OF EMBODIMENTS

Hereinafter, embodiments of the present invention will be described with reference to the drawings. The present invention is not limited to the embodiments described below.

[Waterproof Sound-Transmitting Member]

Figure 1A:
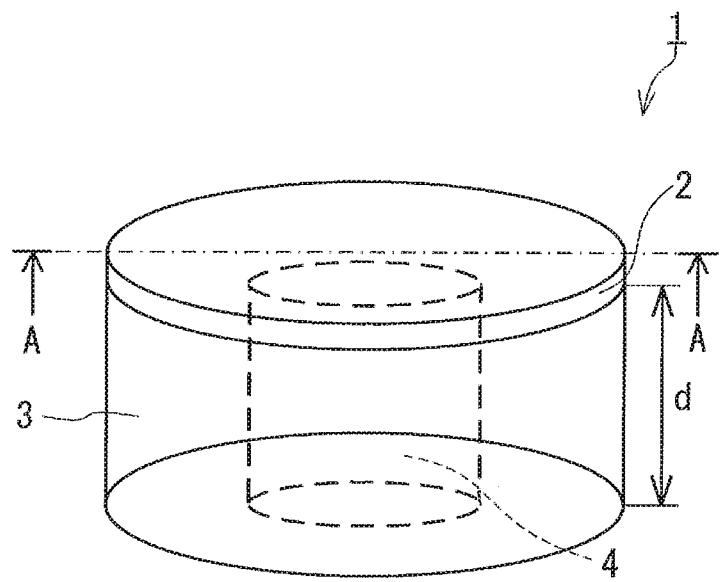
FIG. 1A is a perspective view schematically showing an example of the waterproof sound-transmitting member of the present invention.
Figure 1B:
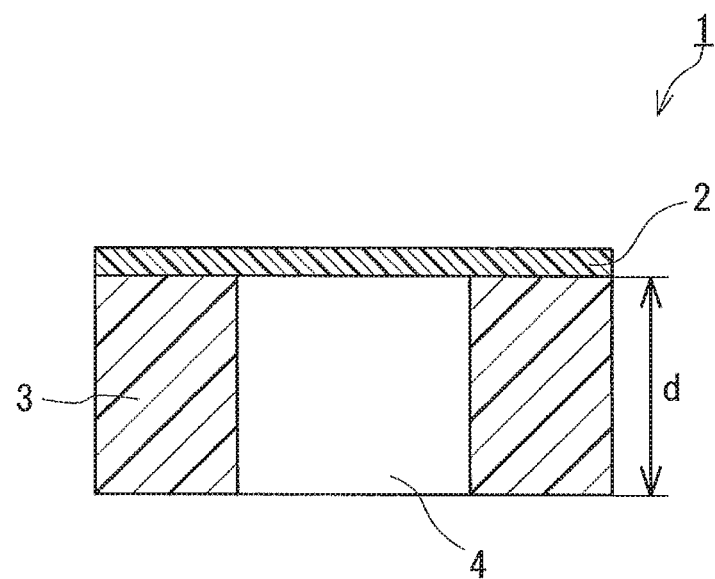
FIG. 1B is a cross-sectional view showing a cross-section A-A of the waterproof sound-transmitting member shown in FIG. 1A.

FIG. 1A and FIG. 1B show an example of the waterproof sound-transmitting member of the present invention. FIG. 1B is a cross-sectional view showing a cross-section A-A of a waterproof sound-transmitting member (hereinafter, also referred to simply as "sound-transmitting member") 1 in FIG. 1A. The sound-transmitting member 1 in FIG. 1A and FIG. 1B includes a waterproof sound-transmitting membrane (hereinafter, also referred to simply as "sound-transmitting membrane") 2 and a support layer 3. The support layer 3 is joined to one main surface of the waterproof sound-transmitting membrane 2.

The support layer 3 of the sound-transmitting member 1 in FIG. 1A and FIG. 1B has a through hole 4 that extends in the thickness direction of the layer 3 and that serves as a path for sound transmitted through the sound-transmitting membrane 2. When the sound-transmitting member 1 is placed inside a housing, sound propagating between the opening of the housing and a sound-transmitting port of a sound conversion part passes through the sound-transmitting membrane 2 and the through hole 4. The sound-transmitting membrane 2 is joined to the support layer 3 so as to cover one opening of the through hole 4.

Figure 2:
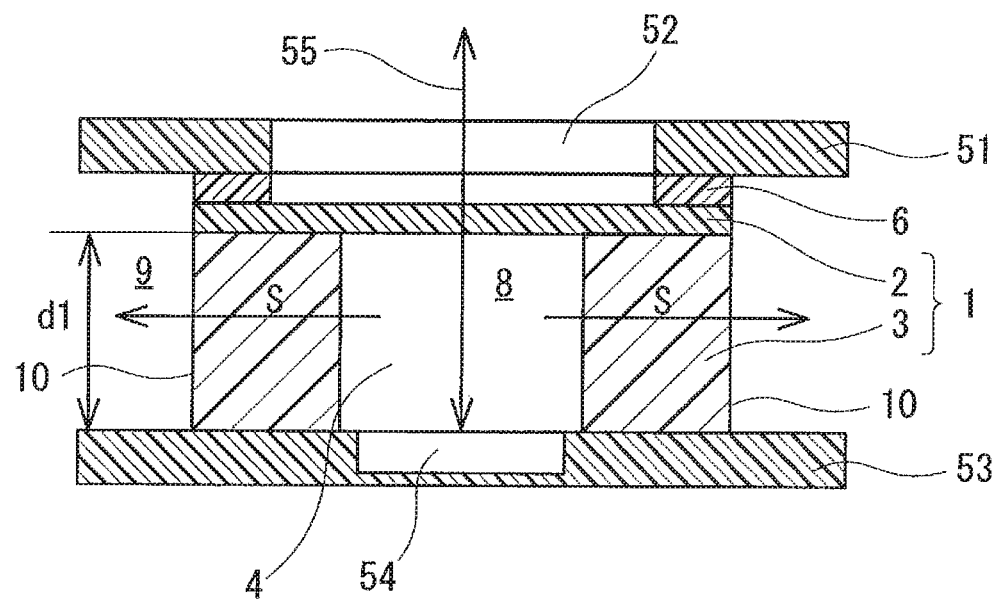
FIG. 2 is a cross-sectional view schematically showing an example of placement of the waterproof sound-transmitting member shown in FIG. 1A and FIG. 1B inside a housing of an electronic device.

FIG. 2 shows an example of a state where the sound-transmitting member 1 in FIG. 1A and FIG. 1B is placed inside a housing of an electronic device. As shown in FIG. 2, the sound-transmitting member 1 is placed inside a housing 51 such that the sound-transmitting membrane 2 covers an opening 52 of the housing 51. More specifically, the sound-transmitting member 1 is fixed to the inner surface of the housing 51 by an adhesive layer 6 placed on the main surface (upper surface) of the sound-transmitting membrane 2 that is opposite to the main surface (lower surface) of the sound-transmitting membrane 2 to which the support layer 3 is joined. The adhesive layer 6 can be a part of the sound-transmitting member 1. Entry of water into the housing 51 through the opening 52 is prevented by the sound-transmitting membrane 2. In addition, the sound-transmitting member 1 is placed inside the housing 51 such that the waterproof sound-transmitting membrane 2 and a space 8 (through hole 4), inside the support layer 3, which serve as a path for sound 55, cover a sound-transmitting port of a sound conversion part 54. The support layer 3 is joined to the main surface of the sound-transmitting membrane 2 that is opposite to the main surface at the opening 52 side of the sound-transmitting membrane 2, that is, the support layer 3 is located at the sound conversion part 54 side of the sound-transmitting membrane 2. The surface (lower surface) of the support layer 3 that is opposite to the surface (upper surface) of the support layer 3 to which the sound-transmitting membrane 2 is joined is in contact with an internal member 53 having the sound conversion part 54. The sound 55 propagating between the opening 52 of the housing 51 and the sound-transmitting port of the sound conversion part 54 passes through the sound-transmitting membrane 2 and the through hole 4. In other words, the sound passes through the space 8 which is separated from a space 9 inside the housing 51 by the support layer 3. Accordingly, unnecessary reflection, absorption, resonance, etc., of the sound 55 by the space 9 are inhibited, so that the sound performance of the electronic device provided by the sound conversion part 54 can be improved. In the case where the sound conversion part 54 is a microphone, the reflection, etc., by the space 9 close to the microphone significantly deteriorate the sound performance (sound receiving performance), and thus improvement in sound performance by the sound-transmitting member 1 is particularly large. The sound-transmitting member 1 can be a sound-transmitting member for a microphone.

The support layer 3 is placed inside the housing 51 in a state where the support layer 3 is compressed in the direction of a thickness d (see FIG. 1A and FIG. 1B). The surface of the internal member 53 is not necessarily flat and not necessarily parallel to the lower surface of the support layer 3, but, owing to this compression, the followability of the lower surface of the support layer 3 to the surface of the internal member 53 is increased, so that the space 8 is reliably separated from the space 9.

The compression ratio (compression ratio in the thickness direction) of the support layer 3 inside the housing 51 can be represented by the formula (d−d1)/d×100% using the thickness d of the support layer 3 before the sound-transmitting member 1 is placed inside the housing 51 and a thickness d1 (see FIG. 2) of the support layer 3 after the sound-transmitting member 1 is placed inside the housing 51. The compression ratio of the support layer 3 is, for example, 10 to 90%, and can be 15 to 70% or 20 to 60%. Here, the sound-transmitting membrane 2 includes a non-porous membrane, and an air permeability (air permeability in the membrane thickness direction) thereof, as expressed by Gurley number, is 10,000 seconds/100 mL or more. That is, the sound-transmitting membrane 2 has almost no air permeability in the membrane thickness direction. Meanwhile, the support layer 3 has, between the through hole 4 (space 8) and an outer peripheral side surface 10, side air permeability S represented as an air permeability of a predetermined value or more even when compressed at a compression ratio of 20% in the thickness direction. Accordingly, when placing the sound-transmitting member 1 inside the housing 51, more specifically, when compressing the support layer 3 in the thickness direction, the pressure in the space 8 does not excessively rise, and upward bulge of the sound-transmitting membrane 2 is inhibited. Thus, the sound-transmitting member 1 includes the sound-transmitting membrane 2 including a non-porous membrane, but reduces a variation in sound transmission characteristics after being placed inside the housing 51. According to the study by the present inventors, in compression of a support layer when being placed inside a housing, the pressure rise rate of the space 8 is particularly high until reaching a compression ratio of 20%, and the rate tends to be greatly reduced at a compression ratio more than 20%. Thus, since the support layer 3 has the side air permeability S when being compressed at a compression ratio of 20%, an excessive rise in the pressure in the space 8 when the support layer 3 is compressed in the thickness direction can be inhibited.

The support layer 3 includes a resin foam material. Therefore, the support layer 3 can be compressed in the thickness direction. However, the support layer 3 has a side air permeability of a predetermined value or more. Thus, the resin foam material forming the support layer 3 is not a foam material containing only closed cells but a foam material having communication holes connecting between the through hole 4 (space 8) and the outer peripheral side surface 10. In addition, the support layer 3 can be formed from a material that can be compressed in the thickness direction at a desired compression ratio without being destroyed when the sound-transmitting member 1 is placed inside the housing 51.

The type of the resin foam material included in the support layer 3 is not limited. The support layer 3 can include an organic resin foam material. The support layer 3 including an organic resin foam material has high processability as compared to the case where the support layer 3 includes a silicone resin foam material (silicone foam), and, for example, the processing accuracy of the upper surface and the lower surface of the support layer 3 can be improved, so that the support layer 3 and the sound-transmitting membrane 2 can be more reliably joined together and the followability of the support layer 3 to the surface of the internal member 53 can be improved.

Examples of the organic resin foam material include an olefin-based resin foam material (olefin-based foam material) and a urethane-based resin foam material (urethane-based foam material), and a urethane-based resin foam material is preferable. That is, the support layer 3 can include, for example, an olefin-based foam material or a urethane-based foam material, and preferably includes a urethane-based foam material. The olefin-based resin is a resin (resin composition) containing, for example, 50 mass % or more of a polyolefin. The content of the polyolefin in the olefin-based resin can be 80 mass % or more, 90 mass % or more, or even 100 mass %. Examples of the polyolefin include polyethylene and polypropylene, and the polyolefin can be polypropylene. The olefin-based resin may contain an ethylene-propylene rubber instead of, or in addition to, the polyolefin.

Examples of the ethylene-propylene rubber include ethylene-propylene copolymer rubbers and ethylene-propylene-diene terpolymer rubbers. The urethane-based resin is a resin (resin composition) containing, for example, 50 mass % or more of a polyurethane. The content of the polyurethane in the urethane-based resin can be 80 mass % or more, 90 mass % or more, or even 100 mass %. The polyurethane as a material is not limited, and known polyurethane materials can be used.

The side air permeability of the support layer 3 is 0.1 mL/(min·mm$^3$) or more as a value per unit volume of the support layer when the support layer is compressed at a compression ratio of 20% (hereinafter, for the description of the sound-transmitting member 1, this value is referred to simply as "side air permeability"). If the side air permeability is less than 0.1 mL/(min·mm$^3$), sufficient side air permeability S is not obtained when the sound-transmitting member 1 is placed inside the housing 51, so that the variation in sound transmission characteristics of the ventilation member 1 after the placement is increased. The side air permeability of the acoustic gasket of Patent Literature 3 is almost zero as is obvious from the name "gasket", which is defined as a member that prevents outflow of a fluid such as gas or oil and that is placed between two surfaces to maintain air tightness, and is naturally less than 0.1 mL/(min·mm$^3$).

The upper limit of the side air permeability of the support layer 3 is, for example, is 50 mL/(min·mm$^3$) or less, and can be 10 mL/(min·mm$^3$) or less, 5 mL/(min·mm$^3$) or less, or even 1 mL/(min·mm$^3$) or less. When the upper limit of the side air permeability of the support layer 3 is within these ranges, the insertion loss itself of the sound-transmitting member 1 can also be reduced in addition to reduction of the variation in sound transmission characteristics. That is, in this case, the sound transmission characteristics of the sound-transmitting member 1 can be further improved. It is inferred that this is based on the fact that, when the sound 55 passes through the space 8 having the inner surface of the support layer 3 as a wall surface, a state where the insertion loss is less likely to rise is obtained for balance between reflection and absorption of the sound 55 at the wall surface. If the side air permeability of the support layer 3 exceeds the range of the upper limit, or if the side air permeability of the support layer 3 is less than 0.1 mL/(min·mm$^3$), such a balance is not established, and the insertion loss of the sound-transmitting member 1 tends to increase.

The reason why the side air permeability of the support layer 3 is specified by a value per unit volume (mm$^3$) of the support layer 3 is to eliminate the influence of the shape of the support layer 3, such as the thickness of the support layer 3 and the distance between the outer circumferential surface and the inner circumferential surface of the support layer 3, as much as possible.

For the support layer 3 including a resin foam material, a 20% compression load (repulsive force generated when the support layer 3 is compressed in the thickness direction at a compression ratio of 20%) in the thickness direction can be 0.05 N/mm$^2$ or less, and can be 0.03 N/mm$^2$ or less or even 0.02 N/mm$^2$ or less. Such a flexible support layer 3 has high followability to the surface of the internal member 53 when placing the sound-transmitting member 1 inside the housing 51. In addition, when the 20% compression load in the thickness direction is within the above range and the upper limit of the side air permeability is within the above range, particularly 1 mL/(min·mm$^3$) or less, the insertion loss of the sound-transmitting member 1 can be more reliably reduced. Moreover, in this case, an insertion loss for high-pitched sound, for example, sound having a frequency of 3 kHz, can be particularly reduced. It is inferred that this is based on the fact that, when the sound 55 passes through the space 8 having the inner surface of the support layer 3 as a wall surface, a state where the insertion loss is further less likely to rise is obtained where for balance between reflection and absorption of the sound 55 at the wall surface. The lower limit of the 20% compression load of the support layer 3 is not limited, and is, for example, 0.001 N/mm$^2$ or more and can be 0.005 N/mm$^2$ or more.

The thickness d of the support layer 3 is not limited, and is, for example, 0.1 to 15 mm and can be 0.5 to 3 mm or 1.5 to 2 mm. The thickness d can be 0.5 mm or more.

Figure 3:
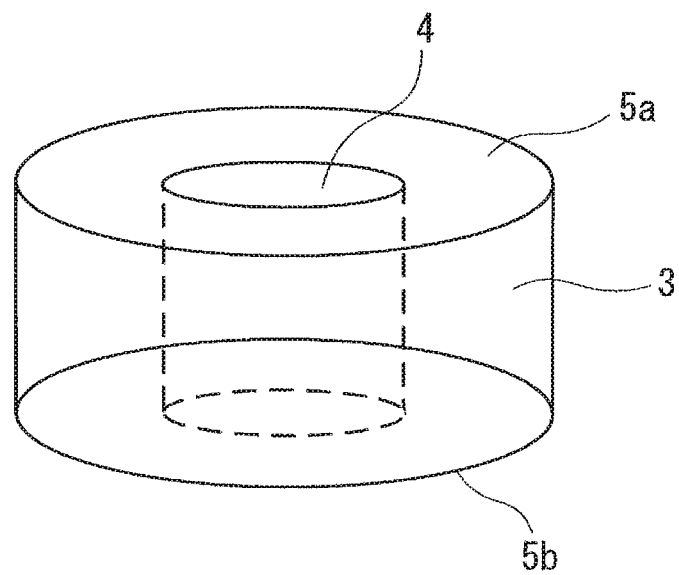
FIG. 3 is a perspective view schematically showing an example of a support layer of the waterproof sound-transmitting member of the present invention.

FIG. 3 shows the support layer 3 of the sound-transmitting member 1 in FIG. 1A and FIG. 1B. A cross-section, of the support layer 3 shown in FIG. 3, in a direction perpendicular to the thickness direction has a ring shape surrounding the through hole 4. The shape is also a shape that allows the support layer 3 to be joined to an edge portion of the circular sound-transmitting membrane 2 when joining the support layer 3 to the sound-transmitting membrane 2. When joining the support layer 3 to the sound-transmitting membrane 2, the outer circumferential surface of the support layer 3 and the outer edge of the sound-transmitting membrane 2 normally coincide with each other. An upper surface 5a of the support layer 3 shown in FIG. 3 has a shape corresponding to the edge portion of the sound-transmitting membrane 2.

The shape of the support layer 3 is not limited to the example shown in FIG. 1A and FIG. 1B. For example, when the sound-transmitting membrane 2 has a rectangular shape or a shape obtained by rounding the corners of a rectangle as seen from a direction perpendicular to a main surface of the sound-transmitting membrane 2, the cross-section, of the support layer 3, in the direction perpendicular to the thickness direction can have a picture frame shape corresponding to the edge portion of the sound-transmitting membrane 2. The distance between the outer circumferential surface and the inner circumferential surface in the cross-section in the case where the cross-section has a ring shape or a picture frame shape (½ of the difference between the outer diameter and the inner diameter in the case where the cross-section has a ring shape) is, for example, 1.0 to 3.0 mm and can be 1.5 to 2.5 mm or 1.8 to 2.3 mm. The shape of the cross-section may be uniform or changed from the upper surface 5a (surface joined to the sound-transmitting membrane 2) to a lower surface 5b of the support layer 3.

The number and the shape of through holes 4 in the support layer 3 are not limited. The support layer 3 shown in FIG. 3 has one through hole 4 at the center thereof as seen from the upper surface 5a or the lower surface 5b. In addition, the through hole 4 of the support layer 3 shown in FIG. 3 has a columnar shape having a center axis in the thickness direction of the support layer 3.

The ratio B/A of the area B of the through hole 4 to the area A of the support layer 3 (excluding the through hole 4) in the cross-section perpendicular to the thickness direction of the support layer 3 is, for example, 0.03 to 0.2 and can be 0.05 to 0.15.

The upper surface 5a and the lower surface 5b of the support layer 3 can be parallel to each other. In this case, the sound-transmitting member 1 is more reliably placed inside the housing 51. The shape of the lower surface 5b of the support layer 3 can change in accordance with the shape of the surface of the internal member 53 on which the sound-transmitting member 1 is placed.

The method for forming the support layer 3 is not limited. The support layer 3 can be formed by applying a known resin molding technique and foaming technique.

The sound-transmitting membrane 2 includes a non-porous membrane. The sound-transmitting membrane 2 may be a single-layer membrane or may be a laminated membrane that is a laminate of two or more membranes. The sound-transmitting membrane 2 that is a laminated membrane includes at least one layer of a non-porous membrane. The non-porous membrane is typically formed from a resin.

The term "non-porous" means that there are no pores providing communication between one main surface and another main surface of a membrane or the number of such pores is very small. In the present specification, a membrane having an air permeability (air permeability in the membrane thickness direction), expressed by Gurley number, of 10,000 seconds/100 mL or more is defined as a non-porous membrane. The air permeability of the sound-transmitting membrane 2 including at least one layer of a non-porous membrane is 10,000 seconds/100 mL or more as expressed by Gurley number. As is obvious from the above air permeability, the sound-transmitting membrane 2 has almost no air permeability in the membrane thickness direction, and sound is transmitted through the sound-transmitting membrane 2 due to vibration of this membrane. In the present specification, the term "Gurley number" refers to an air resistance (Gurley air permeability) measured according to the Oken type testing machine method specified in the Japanese Industrial Standards (JIS) P8117: 2009. Even if the size of a sound-transmitting membrane does not satisfy the recommended test piece dimensions (50 mm×50 mm) of the Oken type testing machine method, evaluation of air resistance according to the Oken type testing machine method is possible by using a measurement jig.

The measurement jig has a shape and a size that allow the measurement jig to be placed on an air permeability measuring portion of the Oken type testing machine, and the thickness and the material of the measurement jig are a thickness and a material that do not change by a differential pressure applied to a test piece upon measurement of air resistance. An example of the measurement jig is a polycarbonate disc having a thickness of 2 mm and a diameter of 47 mm. A through hole having an opening with a smaller size than a membrane to be evaluated is provided at the center in a surface of the measurement jig. The through hole typically has a circular cross-section and has a diameter that allows the opening of the through hole to be fully covered with the membrane to be evaluated. As the diameter of the through hole, for example, 1 mm or 2 mm can be adopted. Next, the membrane to be evaluated is fixed to one surface of the measurement jig so as to cover the opening. The fixation is performed such that, during measurement of air resistance, air passes through only the opening and an effective test portion (portion overlapping the opening as seen from a direction perpendicular to a main surface of the fixed membrane) of the membrane to be evaluated, and the fixed portion of the membrane does not hinder passing of air through the effective test portion of the membrane. For fixing the membrane, a double-faced adhesive tape having a ventilation port punched in a center portion thereof with a shape that matches the shape of the opening can be used. The double-faced adhesive tape can be placed between the measurement jig and the membrane such that the circumference of the ventilation port and the circumference of the opening coincide with each other.

Next, the measurement jig having the membrane fixed thereto is set on the air permeability measuring portion of the Oken type testing machine such that the fixed surface of the membrane is at the downstream side of airflow during measurement, a test by the Oken type testing machine method is conducted, and an air resistance indication value t indicated by the testing machine is recorded. Next, the recorded air resistance indication value t is converted into a value $t_K$ per effective test area 6.452 [cm$^2$] specified in the Oken type testing machine method, by the equation $t_K$=(t× (area of effective test portion [cm$^2$])/6.452 [cm$^2$]), and the obtained conversion value $t_K$ can be regarded as an air resistance (Gurley air permeability) of the membrane measured according to the Oken type testing machine method.

The material forming the non-porous membrane that can be included in the sound-transmitting membrane 2 is not limited. Examples of the material include: PTFE; polyesters such as polyethylene terephthalate (PET); polycarbonates; polyolefins such as polyethylene; polyimides; and elastomers. The elastomers may each be a rubber-like elastic material (thermosetting rubber) or a thermoplastic elastomer, and a rubber-like elastic material is preferable. The rubber-like elastic material preferably has a hardness of 20 to 80 as a Type A hardness specified in JIS K6253: 2012. Examples of the rubber-like elastic material include silicone rubbers, ethylene-propylene-diene terpolymer rubbers, and acrylic rubbers, and silicone rubbers are preferable from the viewpoint of excellent heat resistance and chemical resistance. The material forming the non-porous membrane is preferably PTFE, polyesters, and silicone rubbers, and more preferably PTFE and silicone rubbers. A non-porous membrane formed from PTFE and a non-porous membrane formed from a silicone rubber have good balance between mass and strength. The sound-transmitting membrane 2 that is a single-layer membrane can be formed from these materials.

The non-porous membrane that can be included in the sound-transmitting membrane 2 can be formed from oriented PTFE. The non-porous membrane formed from the oriented PTFE has particularly good balance between mass and strength.

The non-porous membrane preferably has a structure oriented in both an MD direction (flow direction) and a TD direction (in-plane direction perpendicular to the MD direction). The term "oriented" means the orientation of molecular chains (here, PTFE chains) that are common in the field of polymers. Whether or not PTFE is oriented can be confirmed by, for example, X-ray diffraction measurement (XRD measurement). More specifically, if the presence of a peak can be confirmed in the circumferential direction intensity profile of a diffraction image obtained by wide-angle X-ray diffraction measurement, it can be determined that PTFE is oriented.

The thickness of the sound-transmitting membrane 2 is, for example, 1 to 25 μm and can be 1 to 20 μm. The surface density of the sound-transmitting membrane 2 is, for example, 1 to 30 g/m$^2$ and can be 1 to 25 g/m$^2$. When the surface density and the thickness of the sound-transmitting membrane 2 are within the above-described ranges, both waterproofness and sound transmission of the sound-transmitting membrane 2 are more easily achieved. The surface density means the mass of the membrane per unit area, and is calculated by dividing the mass of the membrane by the area of the membrane (the area of a main surface thereof.

The shape of the sound-transmitting membrane 2 is not limited. The sound-transmitting membrane 2 shown in FIG. 1A and FIG. 1B has a circular shape as seen from a direction perpendicular to a main surface thereof. The sound-transmitting membrane 2 can have another shape, and can have, for example, an elliptical shape, a rectangular shape, a shape obtained by rounding the corners of a rectangle, or the like as seen from the direction perpendicular to the main surface.

The water entry pressure of the sound-transmitting membrane 2 is, for example, 50 kPa or more. The water entry pressure can be 100 kPa or more and 500 kPa or more. The upper limit of the water entry pressure is not particularly limited, and is, for example, 1000 kPa or less. The water entry pressure can be measured according to the B method (high water pressure method) of the water resistance test specified in JIS L1092:2009. When deformation of a membrane upon measurement is excessively great, a stainless steel mesh may be placed on the side of the membrane that is opposite to the pressed surface of the membrane.

The sound transmission characteristics of the sound-transmitting membrane 2 can be evaluated, for example, on the basis of an insertion loss at a frequency of 1 kHz (insertion loss for sound having a frequency of 1 kHz). The insertion loss of the sound-transmitting membrane 2 for sound having a frequency of 1 kHz is, for example, 30 dB or less, and can be 20 dB or less, or even 15 dB or less when the effective area of the sound-transmitting membrane 2 is 4.9 mm$^2$.

The effective area of the sound-transmitting membrane 2 is the area of a portion (effective portion) where, when the sound-transmitting membrane 2 is placed as a waterproof sound-transmitting membrane inside a housing, sound is actually inputted to the membrane, transmitted through the membrane, and outputted from the membrane. The effective area does not include, for example, the areas of the support layer 3 and an adhesive portion or the like placed and joined on the edge portion of the sound-transmitting membrane 2 in order to place the membrane. The effective area can typically be the area of the opening portion of the support layer 3, and, more specifically, the area of the opening of the through hole 4 in the upper surface 5a of the support layer 3. The insertion loss of the sound-transmitting membrane increases as the effective area of the membrane decreases, even when the membrane is the same.

As long as the sound-transmitting membrane 2 includes at least one layer of a non-porous membrane and the air permeability thereof is 10,000 seconds/100 mL or more as expressed by Gurley number, the sound-transmitting membrane 2 can include any member. The member is, for example, an air-permeable supporting member laminated on the non-porous membrane. The air-permeable supporting member has a function of supporting the non-porous membrane. The air-permeable supporting member is typically a woven fabric, a nonwoven fabric, a mesh, a net, a sponge, a foam, or a porous material body formed from a metal, a resin, or a composite material thereof. Examples of the resin include polyolefins, polyesters, polyamides, polyimides, aramids, fluorine resins, and ultra-high-molecular-weight polyethylenes. The air-permeable supporting member can be laminated on the non-porous membrane by a joining method such as heat lamination, heat welding, and ultrasonic welding. The shape of the air-permeable supporting member is not limited, and may be, for example, the same shape as the sound-transmitting membrane 2 or the same shape as the support layer 3 (a ring shape) as seen from the direction perpendicular to the main surface.

The sound-transmitting membrane 2 may be subjected to a coloring treatment. Depending on the material forming the sound-transmitting membrane 2, the color of the sound-transmitting membrane 2 that is not subjected to the coloring treatment is, for example, transparent or white. When such a sound-transmitting membrane 2 is placed so as to cover an opening of a housing of an electronic device, the membrane 2 may be conspicuous. The conspicuous membrane may stimulate the curiosity of the user of the electronic device, and the function as a waterproof sound-transmitting membrane may be impaired by puncturing with a needle or the like. When the sound-transmitting membrane 2 is subjected to the coloring treatment, the attention of the user can be relatively suppressed, for example, by setting the color of the membrane 2 to a color that is the same as or similar to that of the housing. In addition, a colored waterproof sound-transmitting membrane may be required due to the design of the electronic device, and such a device design requirement can be met by the coloring treatment.

The coloring treatment can be performed, for example, by dyeing the sound-transmitting membrane 2 or including a coloring agent in the sound-transmitting membrane 2. The coloring treatment may be performed such that, for example, light included in the wavelength range of 380 nm to 500 nm is absorbed. That is, the sound-transmitting membrane 2 may be subjected to a coloring treatment for absorbing light included in the wavelength range of 380 nm to 500 nm. For that purpose, for example, the sound-transmitting membrane 2 is dyed with a coloring agent capable of absorbing light included in the wavelength range of 380 nm to 500 nm, or a dye capable of absorbing light included in the wavelength range of 380 nm to 500 nm. In this case, the sound-transmitting membrane 2 can be colored in blue, gray, brown, pink, green, yellow, etc. The sound-transmitting membrane 2 may be colored in black, gray, brown, or pink.

One example of the coloring agent is carbon black. The sound-transmitting membrane 2 containing carbon black has a gray or black color depending on the amount of the carbon black. In general, regarding the blackness specified in JIS Z8721: 1993, a value of 1 to 4 is determined as "black", a value of 5 to 8 is determined as "gray", and a value of 9 or more is determined as "white".

The sound-transmitting membrane 2 may be subjected to an oil repellent treatment for imparting oil repellency or a liquid repellent treatment for imparting oil repellency or water repellency. Owing to the liquid repellent treatment, when oil droplets or water droplets adhere to the surface of the sound-transmitting membrane 2, the oil droplets or water droplets are more easily removed from the surface of the sound-transmitting membrane 2. The method of the liquid repellent treatment is not limited. The liquid repellent treatment can be performed, for example, by coating with a liquid-repellent substance such as a fluorine-based compound, and a known method can be applied to the coating.

The method for forming the sound-transmitting membrane 2 is not limited. A known method can be applied to the formation of the sound-transmitting membrane 2.

Figure 4:
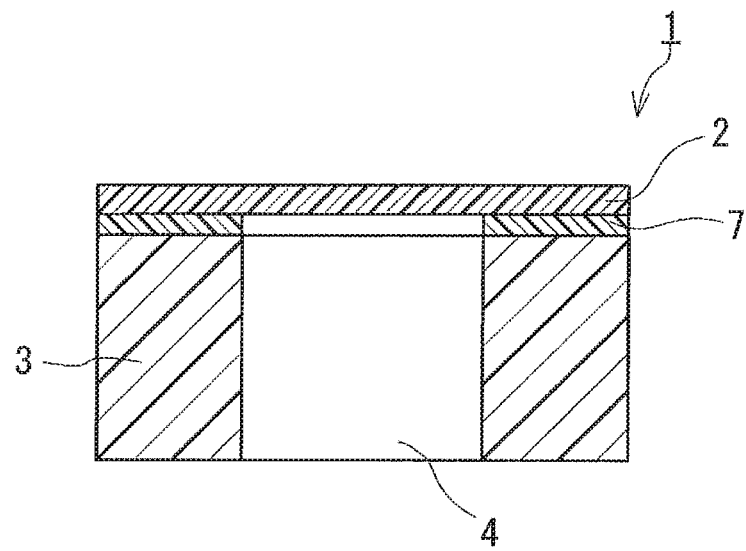
FIG. 4 is a cross-sectional view schematically showing another example of the waterproof sound-transmitting member of the present invention.

The method for joining the sound-transmitting membrane 2 and the support layer 3 together is not limited. In the sound-transmitting member 1 shown in FIG. 1A and FIG. 1B, the sound-transmitting membrane 2 and the support layer 3 are directly joined together. The sound-transmitting membrane 2 and the support layer 3 can be directly joined together, for example, by a welding method such as heat welding or laser welding. As shown in FIG. 4, the sound-transmitting membrane 2 and the support layer 3 may be joined together by an adhesive layer 7. The adhesive layer 7 is, for example, a layer composed of a pressure-sensitive adhesive or an adhesive, or a layer composed of a double-faced adhesive tape. The double-faced adhesive tape includes, for example, a base, a pressure-sensitive adhesive layer or an adhesive layer applied to one surface of the base, and a pressure-sensitive adhesive layer or an adhesive layer applied to the other surface of the base. Examples of the pressure-sensitive adhesive and the adhesive include epoxy-based, acrylic-based, and silicone-based pressure-sensitive adhesives and adhesives.

The shape of the adhesive layer 7 is not limited, and is, for example, a shape that is the shape of the edge portion of the sound-transmitting membrane 2. The shape of the adhesive layer 7 can be a shape that is the shape of the upper surface 5a of the support layer 3 which is a surface joined to the sound-transmitting membrane 2.

In the sound-transmitting member 1 shown in FIG. 1A and FIG. 1B, both the upper surface of the sound-transmitting membrane 2 and the lower surface 5b of the support layer 3 are exposed surfaces. When the sound-transmitting member 1 is placed inside the housing 51, the upper surface of the sound-transmitting membrane 2 is preferably joined to the inner surface of the housing 51, since waterproofness by the sound-transmitting member 1 is more reliably ensured. The sound-transmitting membrane 2 and the housing 51 can be directly joined together, for example, by a welding method such as heat welding or laser welding. As shown in FIG. 2, the sound-transmitting membrane 2 and the housing 51 may be joined together by the adhesive layer 6. The adhesive layer 6 can have, for example, the same configuration as the adhesive layer 7.

Figure 5:
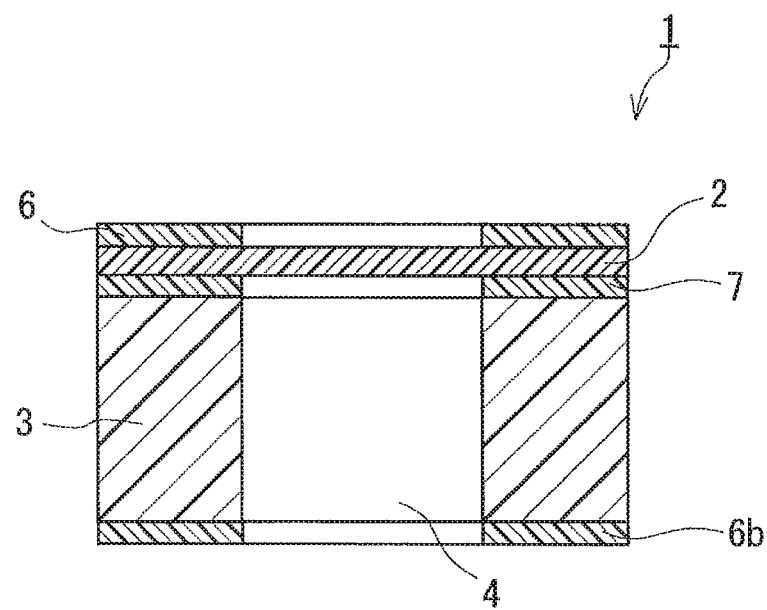
FIG. 5 is a cross-sectional view schematically showing still another example of the waterproof sound-transmitting member of the present invention.

Meanwhile, whether or not the lower surface 5b of the support layer 3 and the internal member 53 are joined together does not influence the waterproofness by the sound-transmitting member 1 as much as joining of the sound-transmitting membrane 2 and the housing 51. From this viewpoint, the support layer 3 and the internal member 53 do not have to be joined together. Therefore, the surface (lower surface 5b) of the support layer 3 that is opposite to the surface of the support layer 3 that is joined to the sound-transmitting membrane 2 can be an exposed surface, or an adhesive layer 6b having the same configuration as the adhesive layer 7 may further be placed on the lower surface 5b as shown in FIG. 5. In the case where the support layer 3 and the internal member 53 are not joined together, for example, the housing 51 is easily removed or replaced for repairing the electronic device.

The sound-transmitting member 1 can have at least one adhesive layer selected from the adhesive layer 6, the adhesive layer 6b, and the adhesive layer 7.

In the sound-transmitting member 1 shown in FIG. 1A and FIG. 1B, the support layer 3 is placed only at one side of the sound-transmitting membrane 2. In the waterproof sound-transmitting member of the present invention, the support layer 3 may be placed at each of both sides of the sound-transmitting membrane 2. In each of sound-transmitting members 1 shown in FIG. 6A and FIG. 6B, a support layer 3 (3a, 3b) is placed at each of both sides of the sound-transmitting membrane 2.

Figure 6A:
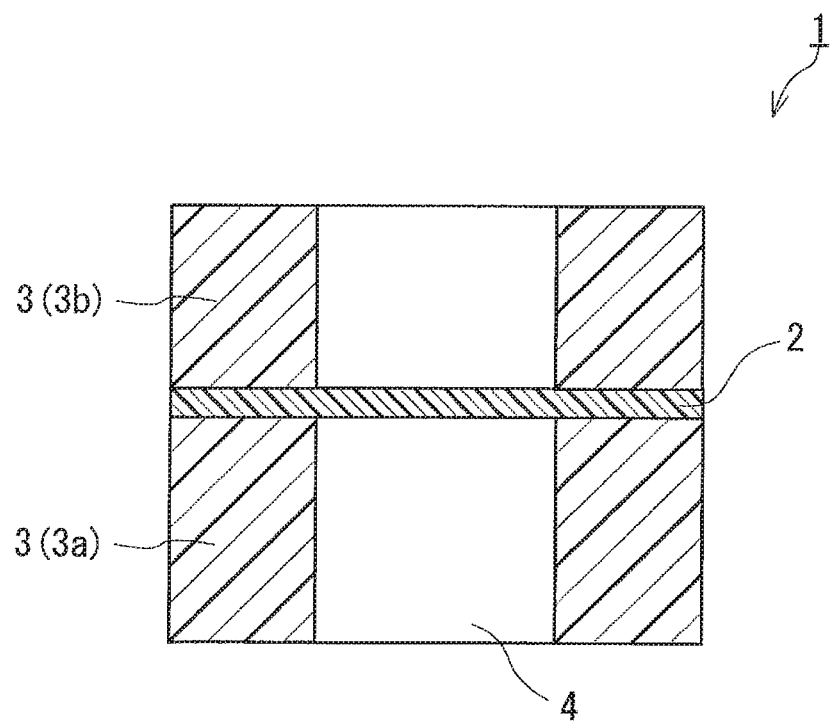
FIG. 6A is a cross-sectional view schematically showing still another example of the waterproof sound-transmitting member of the present invention.
Figure 6B:
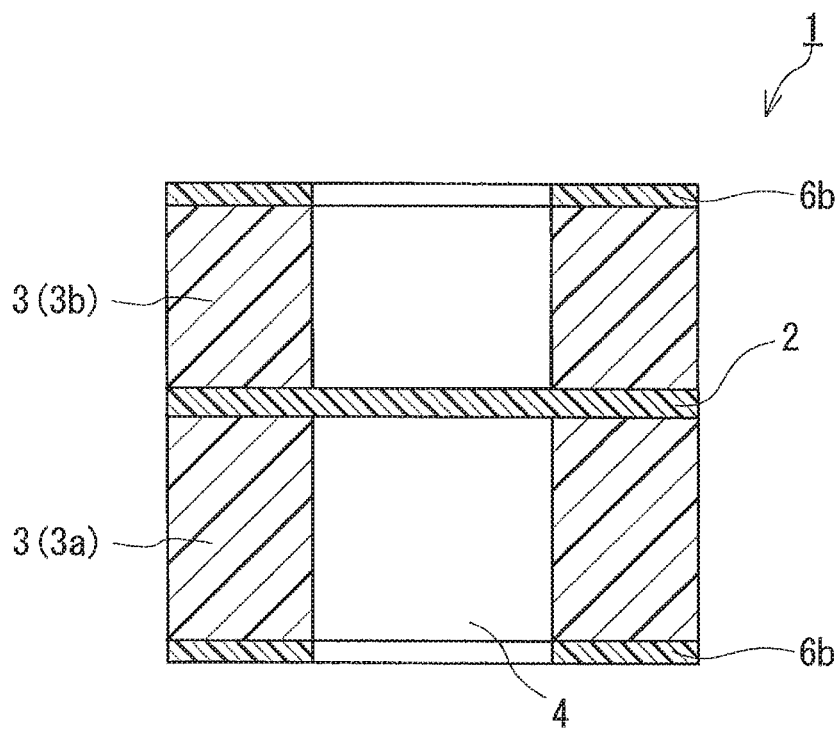
FIG. 6B is a cross-sectional view schematically showing still another example of the waterproof sound-transmitting member of the present invention.

In each of the sound-transmitting members 1 shown in FIG. 6A and FIG. 6B, the configurations and/or the characteristics of the support layers 3a and 3b may be the same or different from each other. For example, the thicknesses d of the support layers 3a and 3b may be different from each other. The sound-transmitting member 1 in which the thicknesses d of the support layers 3a and 3b are different from each other can be placed inside the electronic device such that, for example, the support layer 3 having a larger thickness d is joined to the internal member 53 and the support layer 3 having a smaller thickness d is joined to the housing 51. In the ventilation member 1 shown in FIG. 6B, an adhesive layer 6b that can have the same configuration as the adhesive layer 7 is placed on each of the lower surface of the support layer 3a and the upper surface of the support layer 3b.

The water entry pressure of the sound-transmitting member 1 can be equal to the water entry pressure of the sound-transmitting membrane 2.

Similar to the sound transmission characteristics of the sound-transmitting membrane 2, the sound transmission characteristics of the sound-transmitting member 1 can be evaluated, for example, on the basis of an insertion loss at a frequency of 1 kHz. The insertion loss of the sound-transmitting member 1 for sound having a frequency of 1 kHz is, for example, 26 dB or less and can be 20 dB or less, 15 dB or less, 10 dB or less, or even 8 dB or less, when the effective area of the sound-transmitting membrane 2 is 4.9 $mm^2$.

The sound-transmitting member 1 can be a sound-transmitting member for a microphone. The sound-transmitting member for a microphone is used in a microphone or an electronic device including a microphone. The sound-transmitting member for a microphone prevents entry of water while permitting transmission of sound from the outside of a microphone or an electronic device including a microphone to the sound-transmitting port.

The purpose of the sound-transmitting member 1 is not limited. The sound-transmitting member 1 can be used for the same purpose as a known waterproof sound-transmitting member, and can also be used for a purpose other than the purpose of a waterproof sound-transmitting member included in an electronic device.

[Electronic Device]

FIG. 2 is also a cross-sectional view schematically showing an example of an electronic device including the sound-transmitting member 1. The electronic device includes the sound conversion part 54 that converts between an electric signal and sound, the housing 51 in which the sound conversion part 54 is housed, and the sound-transmitting member 1. The sound conversion part 54 has the sound-transmitting port through which the sound 55 passes from the conversion part and/or to the conversion part. The housing 51 has the opening 52 located between the outside of the housing 51 and the sound conversion part 54. The sound 55 from the outside to the sound conversion part 54 and/or from the sound conversion part 54 to the outside passes through the opening 52. The sound-transmitting member 1 is placed between the housing 51 and the sound conversion part 54 such that the sound-transmitting membrane 2 covers the opening 52, and the through hole 4 (space 8) of the support layer 3 and the sound-transmitting membrane 2 cover the sound-transmitting port of the sound conversion part 54. The support layer 3 is in a state of being compressed in the thickness direction thereof. The compression ratio of the support layer 3 is as described above. The side air permeability between the through hole 4 and the outer peripheral side surface 10 of the support layer 3 in the compressed state is 0.1 mL/(min·mm$^3$) or more as a value per unit volume of the support layer 3. The side air permeability of the support layer 3 in the compressed state can be within the range of "the side air permeability of the support layer 3 per unit volume when the support layer 3 is compressed at a compression ratio of 20%" described above in the description of the sound-transmitting member 1.

In the electronic device, a variation in sound performance provided by the sound conversion part 54 is small owing to the placement of the sound-transmitting member 1. In addition, on the basis of the small variation in sound performance, for example, correction of sound by software can be more easily and efficiently performed, and thus the sound performance can be further improved.

The placement of the sound-transmitting member 1 (placement of the sound-transmitting membrane 2 and the support layer 3) in the electronic device is not limited as long as the sound-transmitting member 1 is placed between the housing 51 and the sound conversion part 54 such that the sound-transmitting membrane 2 covers the opening 52, and the through hole 4 (space 8) of the support layer 3 including a path for the sound 55 and the sound-transmitting membrane 2 cover the sound-transmitting port of the sound conversion part 54, and as long as the support layer 3 is in a state of being compressed in the thickness direction thereof.

The configuration of the electronic device is not limited. The internal member 53 with which the support layer 3 is in contact is, for example, an internal housing or a circuit board having the sound conversion part 54. The sound conversion part 54 may be a sound generator such as a speaker and a transducer, or a microphone. In the case where the sound conversion part 54 is a microphone as described above, the effect of the sound-transmitting member 1 becomes more remarkable. The shape of the opening 52 is not limited, and can be, for example, a circular shape, an elliptical shape, a rectangular shape, or a shape obtained by rounding the corners of a rectangle.

The electronic device is not limited, and is, for example, a mobile communication device such as a smartphone, or a device having an audio function such as a laptop computer, an electronic organizer, a digital camera, a game device, a portable audio device, or a wearable terminal.

EXAMPLES

Hereinafter, the present invention will be described in more detail by way of Examples. The present invention is not limited to Examples given below.

First, a method for evaluating a support layer, a sound-transmitting membrane, and a sound-transmitting member prepared or produced in the examples will be described.

[Side Air Permeability of Support Layer]

Figure 7:
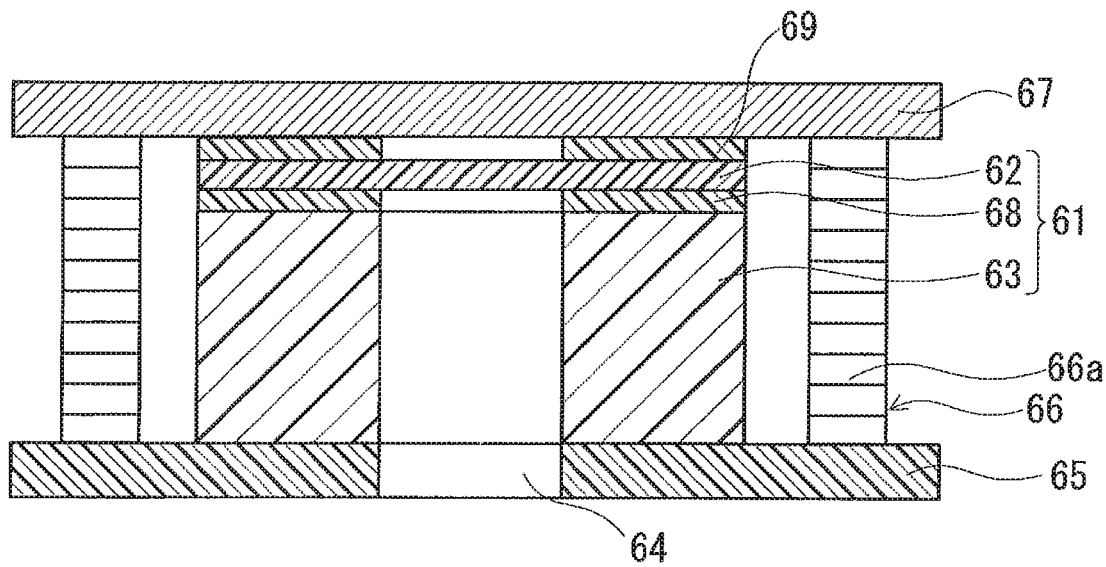
FIG. 7 is a schematic diagram for describing an evaluation method for the side air permeability of a support layer, conducted in Examples.

A method for evaluating the side air permeability of each of support layers prepared in Examples and Comparative Example will be described with reference to FIG. 7.

First, a sound-transmitting membrane 62 that is a non-porous membrane was prepared as described below.

A two-component heat-cured silicone resin (manufactured by Dow Corning Toray Co., Ltd.) was diluted in toluene, and then a carbon black-containing coloring agent (manufactured by Dainichiseika Color & Chemicals Mfg. Co., Ltd.) was mixed thereinto. The mixing amount of the coloring agent was set such that the amount of the carbon black contained in the coloring agent was 0.2 parts by weight per 100 parts by weight of the silicone resin. Next, the obtained mixed solution was dripped onto a PET separator (MRS60, manufactured by Mitsubishi Chemical Corporation) whose surface had been subjected to a silicone release treatment, and a coating membrane was formed using an applicator. Thereafter, the coating membrane was dried by heating to obtain a silicone rubber membrane having a thickness of 100 μm. Next, the obtained silicone rubber membrane was punched out into a circular shape having a diameter of 6.0 mm to obtain the sound-transmitting membrane 62. The air permeability in the thickness direction of the prepared sound-transmitting membrane 62 was 10,000 seconds/100 mL or more as expressed by Gurley number.

Next, a ring-shaped double-faced adhesive tape 68 (No. 5303 W, manufactured by Nitto Denko Corporation, outer diameter: 6 mm, inner diameter: 2.5 mm, thickness: 85 μm) having a shape corresponding to an edge portion of the membrane 62 was attached to one main surface of the sound-transmitting membrane 62. At this time, the double-faced adhesive tape 68 was attached such that the circumference of the sound-transmitting membrane 62 and the outer circumference of the double-faced adhesive tape 68 coincided with each other and no gap was formed between the sound-transmitting membrane 62 and the double-faced adhesive tape 68. Next, a sound-transmitting member 61 was formed by joining a support layer 63, which is to be measured for side air permeability, to the sound-transmitting membrane 62 by the double-faced adhesive tape 68. The support layer 63 has a shape in which a cross-section perpendicular to the thickness direction thereof has the same ring shape (outer diameter: 6 mm, inner diameter: 2.5 mm) as the double-faced adhesive tape 68, from the upper surface to the lower surface of the support layer 63. When joining the support layer 63 to the sound-transmitting membrane 62, the support layer 63 was joined such that the outer peripheral side surface of the support layer 63 and the outer circumference of the double-faced adhesive tape 68 coincided with each other and no gap was formed between the support layer 63 and the double-faced adhesive tape 68. The thickness of the support layer 63 was 1.5 mm except for Example 6. The thickness of the support layer 63 in Example 6 was 2.0 mm.

Next, an acrylic plate 65 having a thickness of 1.5 mm and having a circular opening 64 with an inner diameter of 2.5 mm was prepared, and the support layer 63 was placed on the acrylic plate 65 such that a wall surface of the opening 64 and the inner circumferential surface of the support layer 63 coincided with each other. Next, a ring-shaped double-faced adhesive tape 69 (No. 5303 W, manufactured by Nitto Denko Corporation, outer diameter: 6 mm, inner diameter: 2.5 mm, thickness: 85 μm) having the same shape as the double-faced adhesive tape 68 was placed on the other main surface of the sound-transmitting membrane 62. At this time, the double-faced adhesive tape 69 was placed such that the circumference of the sound-transmitting membrane 62 and the outer circumference of the double-faced adhesive tape 69 coincided with each other.

Next, a circular acrylic plate having a thickness of 1.0 mm and an outer diameter of 6 mm was placed on the double-faced adhesive tape 69 such that the outer circumference of the double-faced adhesive tape 69 and the circumference of the acrylic plate coincided with each other and no gap was formed therebetween (not shown). Next, by sucking air through the opening 64 of the acrylic plate 65, a state where the pressure of the space inside the support layer 63 was reduced to a pressure lower than the ambient pressure by 10 kPa was maintained, and the flow rate of air passing through the opening 64 was measured. The side air permeability per unit volume of the support layer 63 was determined from the measured flow rate. At this time, the support layer 63 was substantially not compressed in the thickness direction thereof, and thus this side air permeability was regarded as a 0% compression side air permeability.

Next, the acrylic plate on the double-faced adhesive tape 69 was removed, and then a laminate of PET films 66a was placed as a spacer 66 around the sound-transmitting member 61 on the acrylic plate 65 such that the uppermost surface of the spacer 66 was higher than the surface of the double-faced adhesive tape 69. Each PET film 66a was formed in a C-shape in which a cut was provided in a part of a ring having an outer diameter of 45 mm and an inner diameter of 25 mm. The cut is a portion for ensuring ventilation from the outside to the outer peripheral side surface of the support layer 63 in the sound-transmitting member 61 located inside a space surrounded by the spacer 66, a weight 67, and the acrylic plate 65 after the spacer 66 and the weight 67 are placed.

Next, the weight 67 for compressing the support layer 63 in the thickness direction thereof was placed on the spacer 66. The mass of the weight 67 was 1000 g. The weight 67 was placed such that a gap was present between the weight 67 and the double-faced adhesive tape 69.

Next, the weight 67 was brought into contact with the double-faced adhesive tape 69 by removing some of the PET films 66a of the spacer 66, and the support layer 63 was compressed in the thickness direction thereof at a compression ratio of 20% by the mass of the weight 67. The PET films 66a were removed stepwise while the state of compression of the support layer 63 by the mass of the weight 67 and the compression ratio of the support layer 63 were confirmed using a dial gauge.

Subsequently by sucking air through the opening 64 of the acrylic plate 65, a state where the pressure of the space inside the support layer 63 was reduced to a pressure lower than the ambient pressure by 10 kPa was maintained, and the flow rate of air passing through the opening 64 was measured. The side air permeability per unit volume of the support layer 63 was determined from the measured flow rate, and this side air permeability was regarded as a 20% compression side air permeability upon compression at a compression ratio of 20%.

[Evaluation of Bulge of Sound-Transmitting Membrane]

Figure 8:
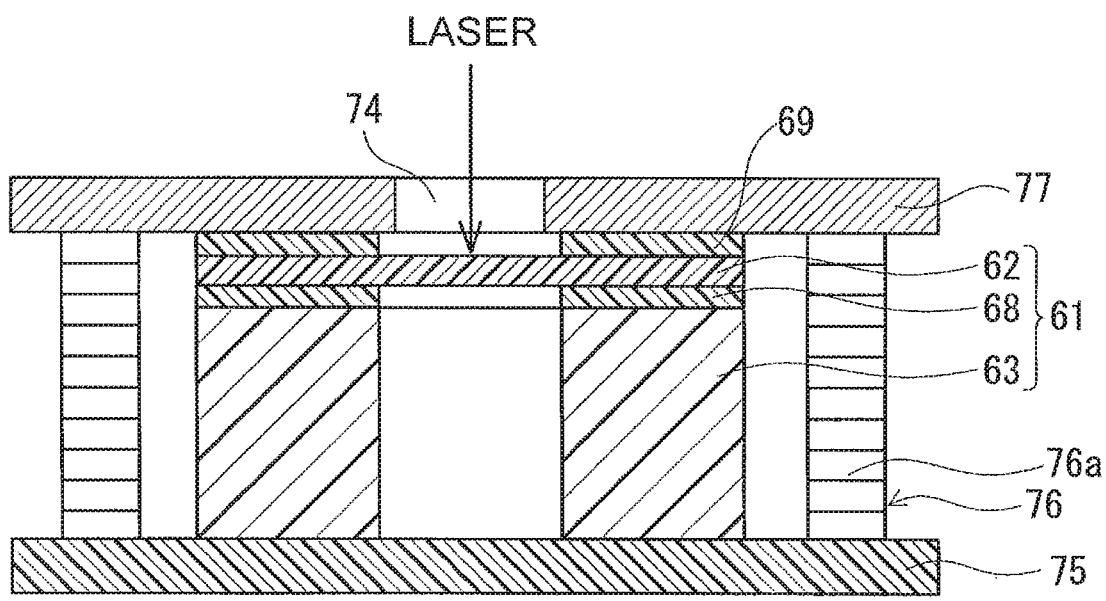
FIG. 8 is a schematic diagram for describing an evaluation method for a bulge of a sound-transmitting membrane, conducted in Examples.

For each of the sound-transmitting members prepared in Examples and Comparative Example, a bulge of the sound-transmitting membrane when the support layer was compressed in the thickness direction thereof was evaluated. The evaluation method will be described with reference to FIG. 8.

First, the silicone rubber membrane used for evaluating the side air permeability of the support layer was prepared as a sound-transmitting membrane 62 which is a non-porous membrane.

Next, a ring-shaped double-faced adhesive tape 68 (No. 5303 W, manufactured by Nitto Denko Corporation, outer diameter: 6 mm, inner diameter: 2.5 mm, thickness: 85 μm) having a shape corresponding to an edge portion of the membrane 62 was attached to one main surface of the sound-transmitting membrane 62. At this time, the double-faced adhesive tape 68 was attached such that the circumference of the sound-transmitting membrane 62 and the outer circumference of the double-faced adhesive tape 68 coincided with each other and no gap was formed between the sound-transmitting membrane 62 and the double-faced adhesive tape 68. Next, a sound-transmitting member 61 was formed by joining a support layer 63 to the sound-transmitting membrane 62 by the double-faced adhesive tape 68. The support layer 63 has a shape in which a cross-section perpendicular to the thickness direction thereof has the same ring shape (outer diameter: 6 mm, inner diameter: 2.5 mm) as the double-faced adhesive tape 68, from the upper surface to the lower surface of the support layer 63. When joining the support layer 63 to the sound-transmitting membrane 62, the support layer 63 was joined such that the outer peripheral side surface of the support layer 63 and the outer circumference of the double-faced adhesive tape 68 coincided with each other and no gap was formed between the support layer 63 and the double-faced adhesive tape 68. The thickness of the support layer 63 was 1.5 mm except for Example 6. The thickness of the support layer 63 in Example 6 was 2.0 mm.

Next, an acrylic plate 75 having a thickness of 1.5 mm was prepared, and the support layer 63 was placed on the acrylic plate 75. Next, a ring-shaped double-faced adhesive tape 69 (outer diameter: 6 mm, inner diameter: 2.5 mm, thickness: 200 μm) having the same shape as the double-faced adhesive tape 68 was placed on the other main surface of the sound-transmitting membrane 62. At this time, the double-faced adhesive tape 69 was placed such that the circumference of the sound-transmitting membrane 62 and the outer circumference of the double-faced adhesive tape 69 coincided with each other.

Next, a laminate of PET films 76a was placed as a spacer 76 around the sound-transmitting member 61 on the acrylic plate 75 such that the uppermost surface of the spacer 76 was higher than the surface of the double-faced adhesive tape 69. Each PET film 76a was formed in a ring shape having an outer diameter of 45 mm and an inner diameter of 25 mm.

Next, a weight 77 having a circular opening 74 with an inner diameter of 1.5 mm and used for compressing the support layer 63 in the thickness direction thereof was placed on the spacer 76. The mass of the weight 77 was 1000 g. The weight 77 was placed such that a gap was present between the weight 77 and the double-faced adhesive tape 69 and the sound-transmitting membrane 62 was able to be observed from above through the opening 74.

Next, a laser was applied to the sound-transmitting membrane 62 through the opening 74, and the initial position of the membrane 62 at a compression ratio of 0% was determined.

Next, the weight 77 was brought into contact with the double-faced adhesive tape 69 by removing some of the PET films 76a of the spacer 76, and the support layer 63 was compressed in the thickness direction thereof at a compression ratio of 20% by the mass of the weight 77. The PET films 76a were removed stepwise while the state of compression of the support layer 63 by the mass of the weight 77 and the compression ratio of the support layer 63 were confirmed using a dial gauge.

Subsequently, a laser was applied to the sound-transmitting membrane 62 through the opening 74, a position of the sound-transmitting membrane 62 when it was assumed that the support layer 63 is compressed at a compression ratio of 20% without bulge of the sound-transmitting membrane 62 was calculated on the basis of the previously determined initial position at a compression ratio of 0%, a bulge of the sound-transmitting membrane 62 (maximum upward displacement amount of the surface of the sound-transmitting membrane 62) from the calculated position was determined, and this bulge was regarded as a bulge of the sound-transmitting membrane when the support layer is compressed in the thickness direction thereof at a compression ratio of 20%.

[Insertion Loss and Variation in Insertion Loss of Sound-Transmitting Member]

Figure 9:
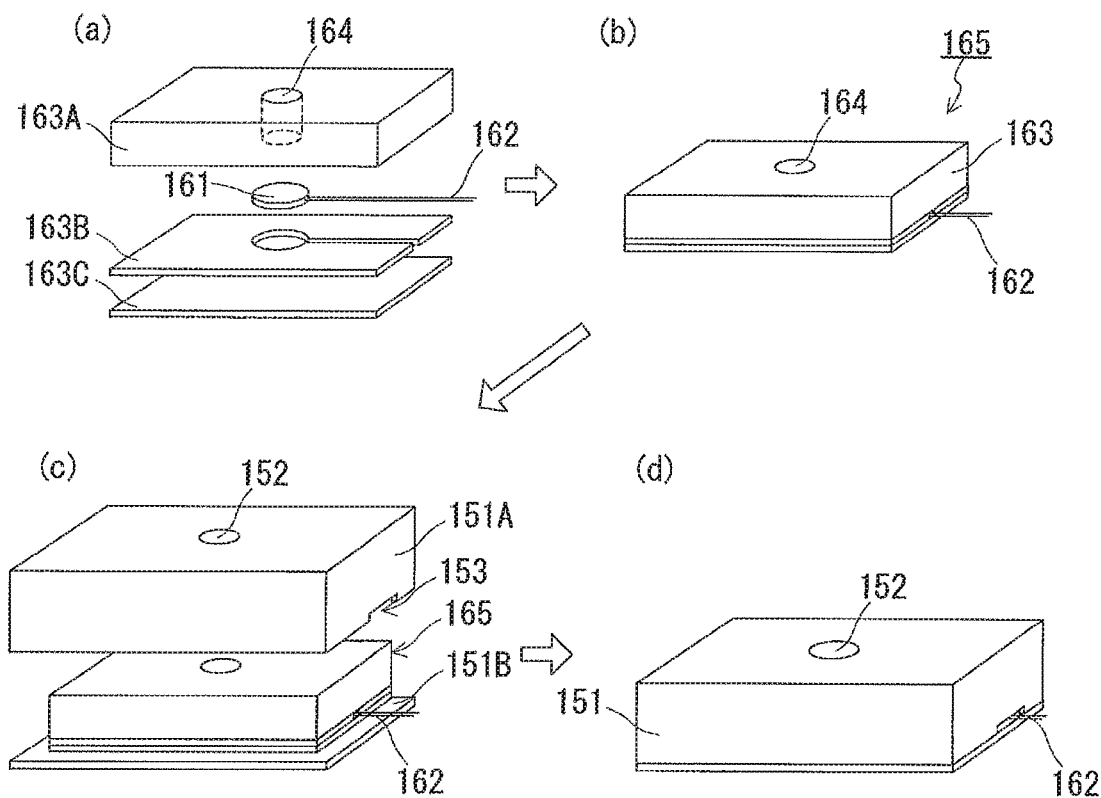
FIG. 9 is a schematic diagram for describing an evaluation method for an insertion loss of a sound-transmitting member, conducted in Examples.
Figure 10:
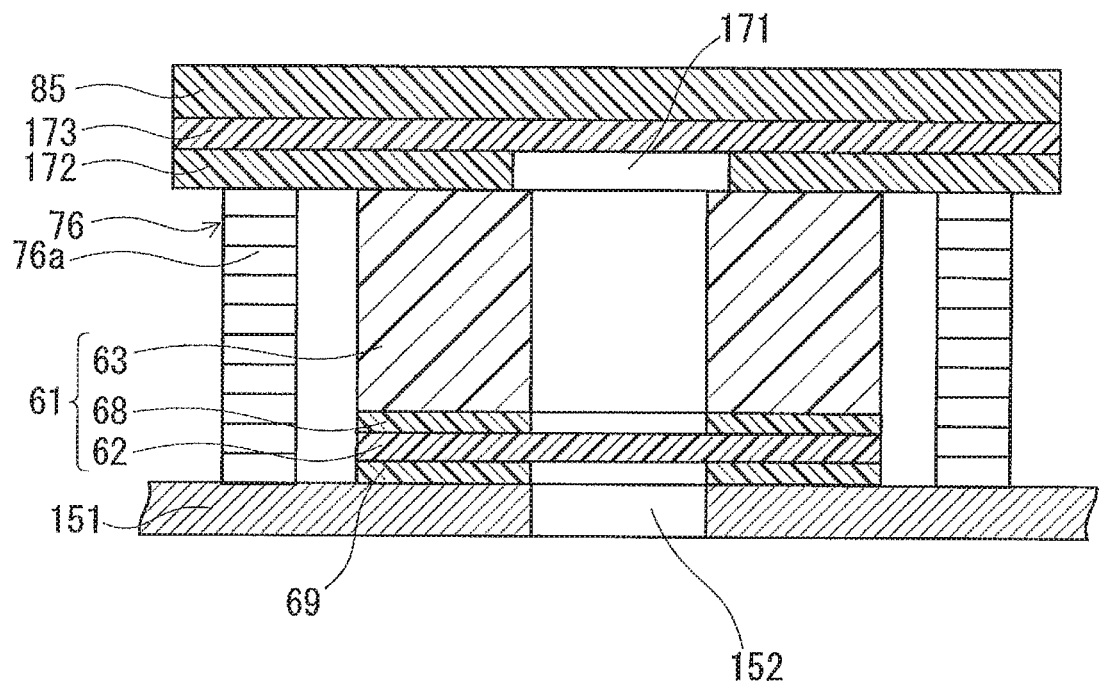
FIG. 10 is a schematic diagram for describing the evaluation method for an insertion loss of a sound-transmitting member, conducted in Examples.

For each of the sound-transmitting members prepared in Examples and Comparative Example, an insertion loss and a variation in insertion loss were evaluated. The evaluation methods will be described with reference to FIGS. 9 and 10.

First, a speaker unit 165 used for evaluation was produced as shown in FIGS. 9(a) and (b). Specifically, the speaker unit 165 was produced as follows. A speaker 161 (SCC-16A, manufactured by STAR MICRONICS CO., LTD.), which is a sound source, and a filler 163 (163A, 163B, 163C) composed of a urethane sponge and used for housing the speaker 161 and preventing unnecessary diffusion of sound from the speaker (preventing generation of sound to be inputted into a microphone for evaluation without being transmitted through the sound-transmitting membrane), were prepared. A sound-transmitting hole 164 having a circular cross-section with a diameter of 5 mm is provided in the filler 163A in the thickness direction thereof, and a cut used for housing the speaker 161 and corresponding to the shape of the speaker 161 and a cut used for housing a speaker cable 162 and leading the cable 162 out of the unit 165 are provided in the filler 163B. Next, the fillers 163C and 163B were overlaid on each other, and the speaker 161 and the cable 162 were housed in the cuts of the filler 163B. Thereafter, the filler 163A was overlaid such that sound is transmitted from the speaker 161 through the sound-transmitting hole 164 to the outside of the unit 165, to obtain the speaker unit 165 (FIG. 9(b)).

Next, the produced speaker unit 165 was housed inside a housing 151 (made of polystyrene, outer shape: 60 mm×50 mm×28 mm) as shown in FIG. 9(c). Specifically, the speaker unit 165 was housed as follows. The prepared housing 151 includes two portions 151A and 151B, and the portions 151A and 151B can be fitted to each other. A sound-transmitting hole 152 (having a circular cross-section with an inner diameter of 2.5 mm) through which sound emitted from the speaker unit 165 housed inside is transmitted to the outside of the housing 151 and a lead-out hole 153 for leading the speaker cable 162 out of the housing 151 are provided in the portion 151A. By fitting the portions 151A and 151B to each other, a space having no opening other than the sound-transmitting hole 152 and the lead-out hole 153 was formed inside the housing 151. The produced speaker unit 165 was placed on the portion 151B, and the portion 151A was then further placed from above and fitted to the portion 151B, thereby housing the unit 165 inside the housing 151. At this time, the sound-transmitting hole 164 of the unit 165 and the sound-transmitting hole 152 of the portion 151A were overlapped such that sound is transmitted from the speaker 161 through both sound-transmitting holes 164 and 152 to the outside of the housing 151. The speaker cable 162 was pulled out from the lead-out hole 153 to the outside of the housing 151, and the lead-out hole 153 was closed with putty (FIG. 9(d)). Separately, the silicone rubber membrane used for evaluating the side air permeability of the support layer was prepared as a sound-transmitting membrane 62 which is a non-porous membrane.

Next, a ring-shaped double-faced adhesive tape 68 (No. 5303 W, manufactured by Nitto Denko Corporation, outer diameter: 6 mm, inner diameter: 2.5 mm, thickness: 85 μm) having a shape corresponding to an edge portion of the membrane 62 was attached to one main surface of the sound-transmitting membrane 62. At this time, the double-faced adhesive tape 68 was attached such that the circumference of the sound-transmitting membrane 62 and the outer circumference of the double-faced adhesive tape 68 coincided with each other and no gap was formed between the sound-transmitting membrane 62 and the double-faced adhesive tape 68. Next, a sound-transmitting member 61 was formed by joining a support layer 63 to the sound-transmitting membrane 62 by the double-faced adhesive tape 68. The support layer 63 has a shape in which a cross-section perpendicular to the thickness direction thereof has the same ring shape (outer diameter: 6 mm, inner diameter: 2.5 mm) as the double-faced adhesive tape 68, from the upper surface to the lower surface of the support layer 63. When joining the support layer 63 to the sound-transmitting membrane 62, the support layer 63 was joined such that the outer peripheral side surface of the support layer 63 and the outer circumferential surface of the double-faced adhesive tape 68 coincided with each other and no gap was formed between the support layer 63 and the double-faced adhesive tape 68. The thickness of the support layer 63 was 1.5 mm except for Example 6. The thickness of the support layer 63 in Example 6 was 2.0 mm.

Next, the sound-transmitting membrane 62 was placed on the produced housing 151 with a double-faced adhesive tape 69 (No. 5303 W, manufactured by Nitto Denko Corporation, outer diameter: 6 mm, inner diameter: 2.5 mm, thickness: 85 μm) therebetween. At this time, the sound-transmitting membrane 62 was placed such that the circumference of the sound-transmitting membrane 62 and the outer circumference of the double-faced adhesive tape 69 coincided with each other and the opening portion of the double-faced adhesive tape 69 fully covered the sound-transmitting hole 152 of the housing 151. In addition, the sound-transmitting membrane 62 was placed such that no gap was formed between the sound-transmitting membrane 62 and the double-faced adhesive tape 69 and between the double-faced adhesive tape 69 and the housing 151. The sound-transmitting member 61 was placed on the housing 151 such that the sound-transmitting membrane 62 was located at the lower side and the support layer 63 was located at the upper side.

Next, a laminate of PET films 76a was placed as a spacer 76 around the sound-transmitting member 61 on the housing 151 such that the uppermost surface of the spacer 76 was higher than the surface of the support layer 63. Each PET film 76a was formed in a ring shape having an outer diameter of 45 mm and an inner diameter of 25 mm.

Next, a laminate of an acrylic plate 172 (thickness: 1.5 mm) having a microphone 171 (Spm0405Hd4H-W8, manufactured by Knowles Acoustics) embedded therein and an acrylic plate 173 (thickness: 1.5 mm) was placed on the spacer 76. A sound receiving surface of the microphone 171 was exposed in the acrylic plate 172, and the laminate was placed such that the sound receiving surface faced the space inside the support layer 63. The acrylic plate 172 and the acrylic plate 173 were joined together using putty such that a load was applied to the sound-transmitting member 61 as evenly as possible by a weight 85 that was to be further placed on the laminate. Next, the weight 85 for compressing the support layer 63 in the thickness direction thereof was placed on the laminate of the acrylic plate 172 and the acrylic plate 173. The mass of the weight 85 was 1000 g. When placing the laminate and the weight 85, the laminate and the weight 85 were placed such that a gap was present between the acrylic plate 172 and the support layer 63.

Next, the acrylic plate 172 was brought into contact with the support layer 63 by removing some of the PET films 76a of the spacer 76, and the support layer 63 was compressed in the thickness direction thereof at a compression ratio of 20% by the mass of the weight 85. The PET films 76a were removed stepwise while the state of compression of the support layer 63 by the mass of the weight 85 and the compression ratio of the support layer 63 were confirmed using a dial gauge.

Next, the speaker 161 and the microphone 171 were connected to an acoustic evaluation apparatus (Multi-analyzer System 3560-B-030, manufactured by Brueel & Kjaer Sound & Vibration Measurement A/S), an SSR (Solid State Response) mode (test signal: 20 Hz to 20 kHz, sweep up) was selected and executed as an evaluation method, and the insertion loss of the sound-transmitting member was evaluated. The insertion loss was automatically determined from a test signal inputted from the acoustic evaluation apparatus to the speaker 161 and a signal received by the microphone 171. For evaluating the insertion loss of the sound-transmitting member, a value (blank value) of insertion loss when the sound-transmitting membrane 62 was removed by tearing the sound-transmitting membrane was separately determined. The blank value was −25.8 dB at a frequency of 1000 Hz.

The insertion loss of the sound-transmitting membrane is a value obtained by subtracting the blank value from a value measured by the acoustic evaluation apparatus. As the value of insertion loss is lower, sound outputted from the speaker 161 is maintained at a higher level (sound volume). In this test method, a graph showing a relationship of the insertion loss of a test piece to the frequency of sound can be obtained, and, for example, the insertion loss of the test piece at a specific frequency can be determined by this graph. In addition, in this test method, use of the sound-transmitting member in a microphone was assumed.

Measurement of insertion loss was performed 10 times for one sample. The average value Av of the ten measurements was regarded as the insertion loss of the sound-transmitting member to be evaluated, and the ratio σ/AV of the standard deviation σ of the measured values of the ten measurements to the average value Av was regarded as a variation in insertion loss.

[20% Compression Load of Support Layer]

First, the sound-transmitting member 61 used for evaluating the side air permeability of the support layer was prepared using each support layer 63 prepared in Examples and Comparative Example.

Next, the prepared sound-transmitting member 61 was placed on a measurement table of a uniaxial compression tester (Tensilon tester; Autograph AGS-X manufactured by Shimadzu Corporation) such that the sound-transmitting membrane 62 was in contact with the measuring table. Next, the support layer 63 was compressed in the thickness direction thereof by lowering a compression element of the tester at a compression speed of 0.5 mm/min until reaching a compression ratio of 20%. After the compression, the repulsive force by the support layer 63 at the time when 10 seconds elapsed was obtained, and this repulsive force was regarded as a 20% compression load of the support layer 63. The temperature of the measurement atmosphere was 25° C.

Examples 1 to 8 and Comparative Example 1

As Examples 1 to 8 and Comparative Example 1, support layers 63 shown in Table 1 below were prepared. Table 1 also shows the 0% compression side air permeability, the 20% compression side air permeability, and the 20% compression load of each support layer 63. The resin foam material of Example 1 is an olefin-based foam material (SCF200, manufactured by Nitto Denko Corporation). The resin foam material of Example 2 is an olefin-based foam material (P1500, manufactured by Nitto Denko Corporation). The resin foam material of Example 3 is a urethane-based foam material (ML-32, manufactured by INOAC CORPORATION). The resin foam material of Example 4 is a urethane-based foam material (L-32, manufactured by INOAC CORPORATION). The resin foam material of Example 5 is a urethane-based foam material (H-32, manufactured by INOAC CORPORATION). The resin foam material of Example 6 is a urethane-based foam material (WP-32, manufactured by INOAC CORPORATION). The resin foam material of Example 7 is a urethane-based foam material (MH-32, manufactured by INOAC CORPORATION). The resin foam material of Example 8 is a urethane-based foam material (U0281SP, manufactured by Fuji Gomu Co., Ltd.). The resin foam material of Comparative Example 1 is a silicone rubber sheet (K-124, manufactured by TOGAWA RUBBER CO., LTD.).

TABLE 1

| | Material of support layer | Side air permeability (unit: mL/(min · mm$^3$)) | | 20% compression load (unit: N/mm$^2$) |
| --- | --- | --- | --- | --- |
| | | 0% compression | 20% compression | |
| Example 1 | Olefin-based | 3.3 | 2.3 | 0.005 |
| Example 2 | Olefin-based | 5.7 | 3.1 | 0.019 |
| Example 3 | Urethane-based | 0.7 | 0.3 | 0.046 |
| Example 4 | Urethane-based | 1.7 | 1.2 | 0.065 |
| Example 5 | Urethane-based | 4.9 | 3.5 | 0.085 |
| Example 6 | Urethane-based | 0.4 | 0.3 | 0.015 |
| Example 7 | Urethane-based | 0.7 | 0.3 | 0.103 |
| Example 8 | Urethane-based | 398.1 | 345.0 | 0.003 |
| Comparative Example 1 | Silicone-based | 0.0 | 0.0 | 0.108 |

Table 2 below shows the bulge of the sound-transmitting membrane when the support layers of Examples 5, 6, and 8 and Comparative Example 1 were used.

TABLE 2

| | Bulge (μm) |
| --- | --- |
| Example 5 | 0.5 |
| Example 6 | 5.9 |
| Example 8 | 0.1 |
| Comparative Example 1 | 470.1 |

As shown in Table 2, when the support layer of Comparative Example 1 having a 20% compression side air permeability of zero was used, the bulge of the sound-transmitting membrane was very large as compared to that when the support layer of each Example was used.

Table 3 below shows the variations in insertion loss and the insertion losses for sound having frequencies of 300 Hz, 1 kHz, and 3 kHz exhibited by the sound-transmitting members in which the support layers of each Example and the Comparative Example were used. The effective areas of the sound-transmitting membranes in these sound-transmitting members are 4.9 mm$^2$.

TABLE 3

| | Variation in insertion loss (dB) | | | Insertion loss (dB) | | |
|---|---|---|---|---|---|---|
| | 300 Hz | 1 kHz | 3 kHz | 300 Hz | 1 kHz | 3 kHz |
| Example 1 | 0.112 | 0.120 | 0.277 | 9.5 | 9.4 | 6.7 |
| Example 2 | 0.070 | 0.066 | 0.125 | 10.9 | 10.8 | 9.2 |
| Example 3 | 0.042 | 0.045 | 0.191 | 8.1 | 8.0 | 3.4 |
| Example 4 | 0.160 | 0.135 | 0.203 | 12.6 | 12.6 | 11.4 |
| Example 5 | 0.039 | 0.046 | 0.071 | 14.3 | 14.1 | 13.3 |
| Example 6 | 0.052 | 0.065 | 0.152 | 9.6 | 9.6 | 7.2 |
| Example 7 | 0.106 | 0.115 | 0.132 | 16.4 | 16.2 | 16.6 |
| Example 8 | 0.070 | 0.096 | 0.119 | 54.0 | 26.7 | 24.1 |
| Comparative Example 1 | 0.169 | 0.176 | 0.266 | 16.5 | 15.6 | 17.3 |

As shown in Tables 1 and 2, in Examples 1 to 8 in which the 20% compression side air permeability of the support layer is 0.1 mL/(min·mm$^3$) or more, in the evaluation of the variation in insertion loss assuming placement inside the housing of the electronic device, the variation was reduced as compared to that of Comparative Example 1 in which the support layer as a gasket having a 20% compression side air permeability of zero was used. In addition, in Examples 1 to 7 in which the 20% compression side air permeability of the support layer is 50 mL/(min·mm$^3$) or less, an increase in insertion loss was inhibited and lower insertion losses were maintained, as compared to those of Example 8 in which a high-air-permeable support layer having a high side air permeability was used. Furthermore, when Examples 1 to 7 are compared to each other, lower insertion losses were maintained in Examples, 1, 2, 3, and 6 in which the 20% compression load is 0.05 N/mm$^2$ or less, and particularly low insertion loss was maintained in Examples 3 and 6 in which the 20% compression side air permeability is lower and 1 mL/(min mm$^3$) or less among Examples 1, 2, 3, and 6.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The waterproof sound-transmitting member of the present invention can be used for the same purpose as a conventional waterproof sound-transmitting member. The purpose is, for example, to impart waterproof performance to an electronic device having sound performance by placement at an opening of a housing of the electronic device.

DESCRIPTION OF THE REFERENCE CHARACTERS 1 waterproof sound-transmitting member
2 waterproof sound-transmitting membrane
3 support layer
4 through hole
5a upper surface
5b lower surface
6 adhesive layer
6b adhesive layer
7 adhesive layer
8 space
9 space
10 outer peripheral side surface
51 housing
52 opening
53 internal member
54 sound conversion part
55 sound
61 sound-transmitting member
62 sound-transmitting membrane
63 support layer
64 opening
65 acrylic plate
66 spacer
66a PET film
67 weight
68 double-faced adhesive tape
69 double-faced adhesive tape
74 opening
75 acrylic plate
76 spacer
76a PET film
77 weight
85 weight
151 housing
151A, 151B portion
152 sound-transmitting hole
153 lead-out hole
161 speaker
162 cable
163, 163A, 163B, 163C filler
164 sound-transmitting hole
165 unit
171 microphone
172 acrylic plate
173 acrylic plate

The invention claimed is:

1. A waterproof sound-transmitting member comprising:
a waterproof sound-transmitting membrane configured to prevent entry of water while permitting sound to pass therethrough; and
a support layer joined to a main surface of the waterproof sound-transmitting membrane, wherein
the waterproof sound-transmitting membrane has an air permeability of 10,000 seconds/100 mL or more as expressed by Gurley number,
the support layer includes a resin foam material and has a through hole extending in a thickness direction thereof and serving as a path for sound transmitted through the waterproof sound-transmitting membrane, and
a side air permeability of the support layer between the through hole and an outer peripheral side surface of the support layer when the support layer is compressed in the thickness direction thereof at a compression ratio of 20% is 0.1 mL/(min·mm$^3$) or more as a value per unit volume of the support layer.

2. The waterproof sound-transmitting member according to claim 1, wherein the side air permeability is 50 mL/(min·mm$^3$) or less.

3. The waterproof sound-transmitting member according to claim 1, wherein the side air permeability is 1 mL/(min·mm$^3$) or less.

4. The waterproof sound-transmitting member according to claim 1, wherein a 20% compression load in the thickness direction of the support layer is 0.05 N/mm$^2$ or less.

5. The waterproof sound-transmitting member according to claim 1, wherein the resin foam material is an organic resin foam material.

6. The waterproof sound-transmitting member according to claim 1, wherein the resin foam material is an olefin-based foam material or a urethane-based foam material.

7. The waterproof sound-transmitting member according to claim 1, wherein a surface of the support layer that is opposite to a surface of the support layer that is joined to the waterproof sound-transmitting membrane is an exposed surface.

8. The waterproof sound-transmitting member according to claim 1, wherein, when an effective area is 4.9 $mm^2$, the waterproof sound-transmitting member has an insertion loss of 26 dB or less for sound having a frequency of 1 kHz.

9. An electronic device comprising:
a sound conversion part configured to convert between an electric signal and sound and having a sound-transmitting port;
a housing in which the sound conversion part is housed, the housing having an opening located between the sound conversion part and an outside; and
a waterproof sound-transmitting membrane placed inside the housing so as to cover the opening and configured to prevent entry of water while permitting sound to pass therethrough via the opening, wherein
the waterproof sound-transmitting membrane has an air permeability of 10,000 seconds/100 mL, or more as expressed by Gurley number,
a support layer is joined to a main surface of the waterproof sound-transmitting membrane that is opposite to a main surface at the opening side of the waterproof sound-transmitting membrane,
the support layer includes a resin foam material,
the support layer has a through hole extending in a thickness direction thereof and serving as a path for sound transmitted through the waterproof sound-transmitting membrane,
the support layer is placed, in a state of being compressed in the thickness direction thereof, between the housing and the sound conversion part such that the through hole and the waterproof sound-transmitting membrane cover the sound-transmitting port, and
a side air permeability of the support layer between the through hole and an outer peripheral side surface of the support layer is 0.1 $mL/(min \cdot mm^3)$ or more as a value per unit volume of the support layer.

10. The electronic device according to claim 9, wherein the sound conversion part is a microphone.

* * * * *